US011601690B2

(12) United States Patent
Zhou (10) Patent No.: US 11,601,690 B2
(45) Date of Patent: Mar. 7, 2023

(54) METHOD AND APPARATUS FOR LIVE STREAMING, SERVER, SYSTEM AND STORAGE MEDIUM

(71) Applicant: BEIJING DAJIA INTERNET INFORMATION TECHNOLOGY CO., LTD., Beijing (CN)

(72) Inventor: Tiantian Zhou, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/514,384

(22) Filed: Oct. 29, 2021

(65) Prior Publication Data
US 2022/0286716 A1    Sep. 8, 2022

(30) Foreign Application Priority Data

Mar. 8, 2021    (CN) .......................... 202110251247.0

(51) Int. Cl.
*H04N 21/218*    (2011.01)
*H04N 21/2187*    (2011.01)
(Continued)

(52) U.S. Cl.
CPC ......... *H04N 21/2187* (2013.01); *G06V 20/41* (2022.01); *G06V 20/46* (2022.01); *G10L 15/08* (2013.01); *G10L 15/22* (2013.01); *G10L 25/57* (2013.01); *H04N 21/23424* (2013.01); *H04N 21/6543* (2013.01); *H04N 21/6587* (2013.01); *G10L 2015/088* (2013.01)

(58) Field of Classification Search
None
See application file for complete search history.

(56) References Cited

U.S. PATENT DOCUMENTS

| 2002/0194595 | A1* | 12/2002 | Miller ................ H04N 21/4542 348/E7.083 |
| 2014/0081954 | A1* | 3/2014 | Elizarov ............ H04N 21/4788 707/722 |
| 2020/0177967 | A1 | 6/2020 | Rakshit et al. |

FOREIGN PATENT DOCUMENTS

| CN | 101790878 A | * | 7/2010 | .............. H04M 1/80 |
| CN | 106303732 A |   | 1/2017 | |

(Continued)

OTHER PUBLICATIONS

Chinese Patent Office, First Office Action in Chinese Patent Application No. 202110251247.0 (dated Apr. 6, 2022).
(Continued)

*Primary Examiner* — Omar S Parra
(74) *Attorney, Agent, or Firm* — Timothy W. Menasco, Esq.; Harter Secrest & Emery LLP (57) ABSTRACT

The disclosure provides a method and an apparatus for live streaming. The method includes receiving a live streaming pausing command sent by a first client, in which the live streaming pausing command is configured to instruct a pause of a live streaming in a live streaming room created with a login account of the first client; pausing acquisition of live streaming data from the first client and acquiring a target resource based on the live streaming pausing command; sending a target resource to a second client to instruct the second client to switch from displaying a live streaming picture to displaying the target resource, in which the second client includes a client of an account entered in the live streaming room.

17 Claims, 7 Drawing Sheets

(51) Int. Cl.
   *G06V 20/40*    (2022.01)
   *G10L 15/08*    (2006.01)
   *G10L 15/22*    (2006.01)
   *G10L 25/57*    (2013.01)
   *H04N 21/234*   (2011.01)
   *H04N 21/6543*  (2011.01)
   *H04N 21/6587*  (2011.01)

(56) References Cited

FOREIGN PATENT DOCUMENTS

| | | | | | |
|---|---|---|---|---|---|
| CN | 106454492 | A | * | 2/2017 | ......... H04N 21/2541 |
| CN | 107241615 | A | | 10/2017 | |
| CN | 107743244 | A | | 2/2018 | |
| CN | 108540854 | A | | 9/2018 | |
| CN | 108810576 | A | | 11/2018 | |
| CN | 109672908 | A | | 4/2019 | |
| CN | 110300311 | A | | 10/2019 | |
| CN | 110858910 | A | | 3/2020 | |
| CN | 111787347 | A | * | 10/2020 | |
| CN | 111787347 | A | | 10/2020 | |
| WO | 2017084279 | A1 | | 5/2017 | |
| WO | 2019024638 | A1 | | 2/2019 | |

OTHER PUBLICATIONS

European Patent Office, Search Report for EP Application No. 21203186.8 (dated Apr. 4, 2022).
European Patent Office, Search Report for EP application 21203186.8, dated Jul. 21, 2022.

* cited by examiner

METHOD AND APPARATUS FOR LIVE STREAMING, SERVER, SYSTEM AND STORAGE MEDIUM

CROSS REFERENCE TO RELATED APPLICATIONS

The present application claims priority to Chinese Patent Application No. 202110251247.0, filed on Mar. 8, 2021, the contents of which is hereby incorporated by reference in its entirety.

TECHNICAL FIELD

The disclosure relates to a field of internet technology, and more particularly to a method and an apparatus for live streaming, a server, a system and a storage medium.

BACKGROUND

In the increasingly popular live streaming service, a common user may start a live streaming, and share his own life and work with worldwide audiences as an anchor in real time, for example the well-known game live streaming, live show (eating broadcast, talent show, tour show).

In some live streaming rooms, the audience can see all the contents in an interface of the anchor side. Taking a game live streaming room as an example, after the audience enters the live streaming room, the audience can see the game played by the anchor, operations and outfits of the anchor and so on. When the anchor launches an application during the live streaming, the audience can see operations of the anchor on the application.

SUMMARY

The disclosure provides a method and an apparatus for live streaming, a server, a system and a storage medium, to at least solve the problem of leakage of personal privacy of an anchor in the related art. The technical solutions will be described as follows.

According to a first aspect of the disclosure, a method for live streaming is provided. The method is applicable to a live streaming server. The method includes: receiving a live streaming pausing command sent by a first client, in which the live streaming pausing command is configured to instruct a pause of a live streaming in a live streaming room created with a login account of the first client; pausing acquisition of live streaming data from the first client and acquiring a target resource based on the live streaming pausing command; sending the target resource to the second client to instruct a second client to switch from displaying a live streaming picture to displaying the target resource, in which the second client includes a client of an account entering the live streaming room.

According to a second aspect of the disclosure, a method for live streaming is provided. The method is applicable to a first client. The method includes: receiving a live streaming pausing operation for a live streaming picture during displaying of the live streaming picture; sending a live streaming pausing command to a live streaming server in response to the live streaming pausing operation, in which the live streaming pausing command is configured to instruct the live streaming server to pause acquisition of live streaming data from the first client to send the target resource to a second client in order to switch from displaying a live streaming picture to displaying the target resource, in which the second client includes a client of an account entering the live streaming room.

According to a third aspect of the disclosure, a server is provided. The server includes a processor and a memory configured to store instructions executable by the processor. The processor is configured to execute the instructions to perform the method according to the first aspect.

According to a fourth aspect of the disclosure, an electronic device is provided. The electronic device includes a processor and a memory configured to store instructions executable by the processor. The processor is configured to execute the instructions to perform the method according to the second aspect.

According to a fifth aspect of the disclosure, a live streaming system is provided. The system includes a first client, a server according to the third aspect and a second client. The first client is configured to send a live streaming pausing command to the server, in which the live streaming pausing command is configured to instruct a pause of a live streaming in a live streaming room created with a login account of the first client. The server is configured to perform the method according to the first aspect. The second client is configured to receive target resource sent by the server, and switch from displaying a live streaming picture to displaying the target resource, in which the second client includes a client of an account entering the live streaming room.

According to a sixth aspect of the disclosure, a computer readable storage medium is provided. When instructions in the computer readable storage medium are executed by a processor of a server, the server is caused to perform the method according to the first aspect or the second aspect.

According to a seventh aspect of the present disclosure, a computer program product is provided. The computer program product includes computer programs. When the computer programs are executed by a processor, the method according to the first aspect or the second aspect is implemented.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the disclosure. The accompanying drawings together with the specification explain the principle of the disclosure, but shall not be construed to limit the disclosure.

DETAILED DESCRIPTION

The solutions of the embodiments of the disclosure are clearly and completely described below with reference to the accompanying drawings in the embodiments of the disclosure.

It is to be understood those terms such as "first" and "second" in the specification, and claims and accompanying drawings may be used solely to distinguish similar objects without necessarily requiring or implying a specific order or sequence. It should be understood that such data may be exchangeable in an appropriate situation, so that embodiments described herein may be executed in an order other than that described in the accompanying or in the specification. The implementations described in the following embodiments shall not be construed to represent all implementations of the present disclosure. Rather, they are merely some examples of the apparatus and method according to some aspects of the present disclosure, as described in the claims.

An anchor may create a live streaming room through a first client and starts a live streaming in the live streaming room. At the same time, an audience may enter the live streaming room through a second client and watch the live streaming. When the audience watches the live streaming, the picture that the audience sees depends on content broadcasted by the anchor. Taking a game live streaming room as an example, after the audience enters the live streaming room, the audience can see the game broadcasted by the anchor, operations and outfits of the anchor and so on.

For such live streaming, the audience can see various operations and contents of the anchor in the live streaming room. However, if the anchor leaves the live streaming room and launches a private application, in this case, the audience can also see operations on the private application of the anchor. For example, the anchor opens a payment application during a game live streaming of the anchor. If money is involved in the page, or the audience knows an account or a phone number of the anchor and an electronic device of the anchor receives a verification code, the verification code may be seen by the audience. An ill-disposed audience may log in to the account of the anchor with the verification code and even transfer the money or the like. Such live streaming room has poor privacy, and may cause leakage of personal privacy of the anchor.

Figure 1:
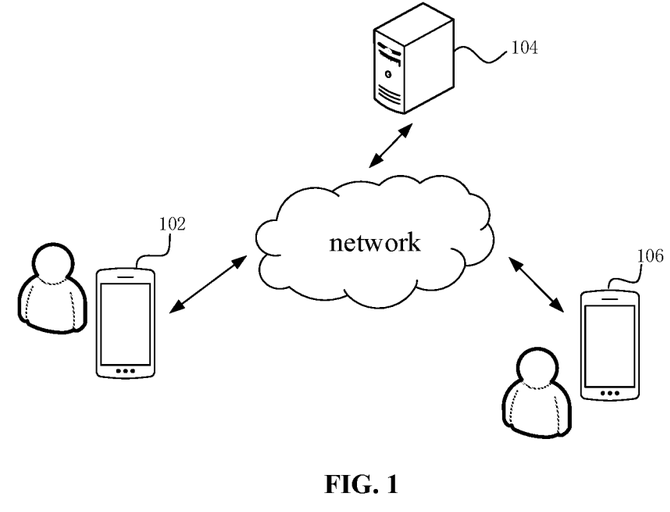
FIG. 1 is a schematic diagram illustrating a live streaming system according to an embodiment of the disclosure.

In order to solve the above problems, the disclosure provides a method for live streaming. FIG. 1 is a schematic diagram illustrating a live streaming system according to an embodiment of the disclosure. As illustrated in FIG. 1, the live streaming system includes a first client installed on a first electronic device 102, a live streaming server 104 and a second client installed on a second electronic device 106.

The Anchor creates a live streaming room by operations on the first client, and the anchor may conduct live streaming in the live streaming room. During the live streaming of the anchor, the first client collects live streaming data. The live streaming server 104 obtains the live streaming data from the first client, and sends the live streaming data to the second client entering the live streaming room. The second client displays a live streaming picture on an interface of the live streaming room based on the live streaming data.

During the live streaming of the anchor, if the anchor needs to pause the live streaming, the anchor may pause the live streaming through the first client. In a case that the first client receives a live streaming pausing operation, the first client sends a live streaming pausing command to the live streaming server 104.

In a case that the live streaming server 104 receives the live streaming pausing command, the live streaming server 104 pauses acquisition of the live streaming data from the first client, obtains target resources, and sends the target resources to the second client.

Since data sent to the second client is replaced with the target resource by the live streaming server 104, the live streaming picture of the second client is switched to the target resource. In this way, if the anchor needs to leave the live streaming room, the anchor may perform the live streaming pausing operation to pause the displaying of the live streaming picture on the second client, such that the personal privacy of the anchor is protected and leakage of the personal privacy of the anchor is avoided.

Figure 2:
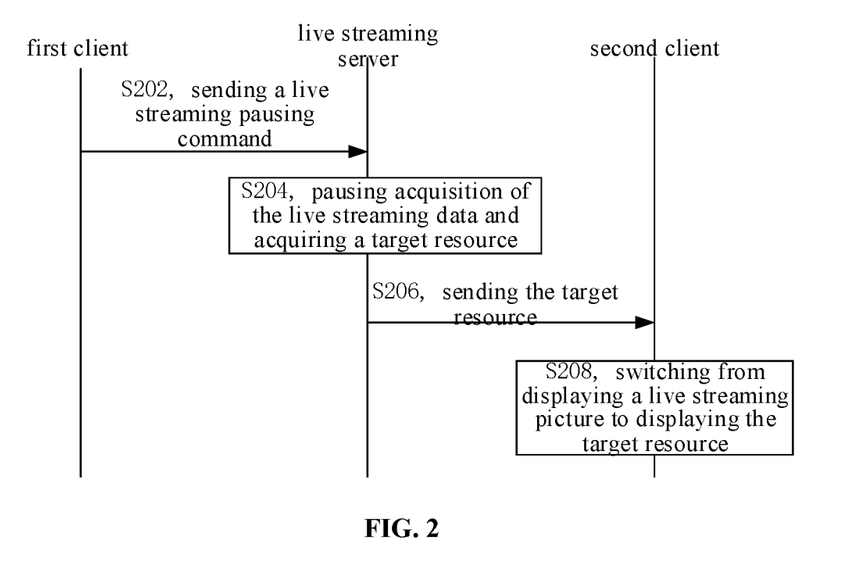
FIG. 2 is a flowchart illustrating a method for live streaming according to an embodiment of the disclosure.

Based on the above live streaming system, the disclosure provides a method for live streaming. FIG. 2 is a flowchart illustrating a method for live streaming according to an embodiment of the disclosure. As illustrated in FIG. 2, the method includes the following.

In S202, in a case that the first client receives a live streaming pausing operation of an anchor, the first client sends a live streaming pausing command to the live streaming server. The live streaming pausing command is configured to instruct a pause of a live streaming in a live streaming room created with a login account of the first client.

As an example, an interface of the first client may display a live streaming pausing control having text "leave for a while". The first client may receive the live streaming pausing operation of the anchor by receiving an operation on the live streaming pausing control displayed on the interface of the first client from the anchor.

As another example, the first client may receive the live streaming pausing operation of the anchor by receiving speech information instructing a pause of the live streaming from the anchor.

Additionally, in a case that the first client receives the live streaming pausing operation, the first client may pause acquisition of live streaming data.

In S204, the live streaming server receives the live streaming pausing command, pauses acquisition of the live streaming data from the first client, and acquires a target resource.

In S204, the live streaming server may pause acquisition of the live streaming data by pausing acquisition of image data from the first client or by pausing acquisition of image data and audio data from the first client.

Acquiring the target resource by the live streaming server may include: acquiring a default system resource, or acquiring a resource uploaded by the first client. The target resource may include at least one of the following: text, images, animations, audio and video. The target resource may include information indicating that the anchor pauses the live streaming, for example the target resource may include text "the anchor pauses the live streaming", such that the text "the anchor pauses the live streaming" is displayed on the second client and the audience may know that the anchor pauses the live streaming through the text.

In S206, the live streaming server sends the target resource to the second client. The second client is a client corresponding to an account entering the live streaming room.

In S208, the second client receives the target resources sent by the live streaming server, and switches from displaying a live streaming picture to displaying the target resource. In this way, the content displayed on an interface of the live streaming room on the second client may be replaced with the target resource.

As an example, before S206, the method may further include recognizing by the live streaming server whether the target resource is sensitive data. S206 may include sending the target resource to the second client in response to recognizing that the target resource is not sensitive data.

Recognizing by the live streaming server whether the target resource is sensitive data may include recognizing a keyword in speech corresponding to audio data in a case that the target resource includes the audio data, and determining whether the audio data is sensitive data based on the keyword; recognizing character feature information in character image data in a case that the target resource includes the character image data, and determining whether the image data is sensitive data based on the character feature information, in which the character feature information may include at least one of the following: age, gender, gestures, degree of exposure of body parts.

In the embodiment, since the data pushed to the live streaming room is switched from the live streaming data to the target resource by the live streaming server, displaying of the live streaming picture on the second client of the audience is switched to displaying of the target resource. In this way, if the anchor needs to leave the live streaming room, the anchor may perform the live streaming pausing operation to pauses the displaying of the live streaming picture on the second client of the audience, such that the personal privacy of the anchor may be protected and leakage of the personal privacy of the anchor may be avoided.

In one or more embodiments of the disclosure, acquiring by the live streaming server the target resource may include acquiring by the live streaming server key information of a live streaming content of the live streaming room and selecting the target resource matched with the key information from a plurality of preset resources.

As an example, acquiring the key information of the live streaming content by the live streaming server may include at least one of the following: extracting by the live streaming server the key information from a live streaming title corresponding to the live streaming room, extracting by the live streaming server the key information from a bullet screen comments in the live streaming room, determining by the live streaming server the key information based on historical live streaming videos in the live streaming room.

As an example, the preset resource may include at least one of a system default resource of the live streaming server and a resource uploaded by the first client in advance.

Selecting by the live streaming server the target resource matched with the key information from the plurality of preset resources may include extracting key information from each preset resource, calculating a similarity between the key information of the live streaming content and the key information of each preset resource, determining that the key information of the live streaming content matches with a preset resource if the similarity between the key information of the live streaming content and the key information of the preset resource is greater than a similarity threshold or determining the preset resource with the maximum similarity as the target resource matched with the key information of the live streaming content.

In the embodiment, the target resource matched with the key information of the live streaming content is selected from the plurality of preset resources, such that the target resource displayed on the second client is adapted to the content of the current live streaming, thus avoiding sense of disharmony when displaying the target resource during the live streaming and improving experience of watching the live streaming.

In one or more embodiments of the disclosure, the preset resource may be locally stored on the first client. The preset resource may be a system default resource or a resource set by the anchor in advance. In a case that the first client receives the live streaming pausing operation from the anchor, if there is only one preset resource, the first client may determine the preset resource as the target resource and send the target resource to the live streaming server. If there are multiple preset resources, the first client may select the target resource matched with the key information of the live streaming content of the live streaming room based on the key information of the live streaming content and send the target resource to the live streaming server.

Accordingly, acquiring by the live streaming server the target resource may include receiving by the live streaming server the target resource sent by the first client. The live streaming server may send the target resource to the second client of the audience, the second client pauses the displaying of the live streaming picture and displays the target resource to the audience.

In one or more embodiments of the disclosure, pausing by the live streaming sever acquisition of the live streaming data from the first client may include pausing by the live streaming sever acquisition of image data from the first client. In this case, if the target resource is graphics and text information, after receiving by the live streaming sever the live streaming pausing command sent by the first client, the method may further include maintaining acquisition of audio data from the first client; and sending the audio data to the second client to play the audio data during the displaying of the target resource on the second client.

In the embodiment, in a case that the anchor instructs a pause of the live streaming, the live streaming server pauses acquisition of the image data from the first client but maintains acquisition of the audio data from the first client and sends the audio data to the second client. In this way, the second client may play the audio data when displaying the target resource. Thus, although the second client of the audience pauses the displaying of the live streaming picture, the anchor can communicate with the audience through audio, which may not cause leakage of the personal privacy of the anchor and may not interrupt the communication between the anchor and the audience.

Figure 3:
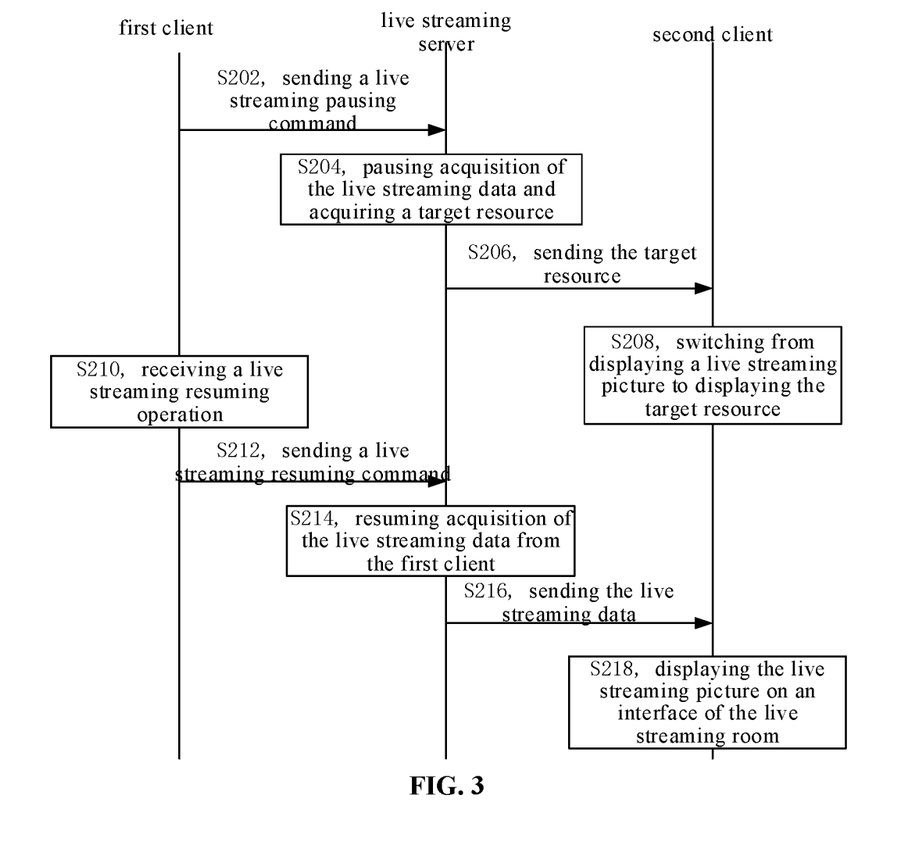
FIG. 3 is a flowchart illustrating a method for live streaming according to an embodiment of the disclosure.

In one or more embodiments of the disclosure, as illustrated in FIG. 3, after S208, the method may further include the following.

S210, the first client receives a live streaming resuming operation from the anchor. For example, the first client may receive an operation on a live streaming resuming control on the interface of the first client. The live streaming resuming control may contain text "I am back". Or the first client may receive speech information indicating a resumption of the live streaming from the anchor.

S212, the first client sends a live streaming resuming command to the live streaming server. The live streaming resuming command is configured to instruct a resumption of the live streaming in the live streaming room.

S214, the live streaming server receives the live streaming resuming command sent by the first client and resumes acquisition of the live streaming data from the first client based on the live streaming resuming command.

S216, the live streaming server sends the acquired live streaming data to the second client.

S218, the second client displays the live streaming picture on an interface of the live streaming room of the second client based on the live streaming data.

In the embodiment, after the anchor pauses the live streaming, if the anchor would like to resume the live streaming, the anchor may perform the live streaming resuming operation on the first client, such that the first client sends the live streaming resuming command to the live streaming server. The live streaming server may resume acquisition of the live streaming data from the first client, and sends the live streaming data to the second client. The second client may resume the displaying of the live streaming picture, so as to resume the live streaming.

In one or more embodiments of the disclosure, after the first client receives the live streaming resuming operation from the anchor, the method may further include sending by the first client a first time point and a second time point to the live streaming server, in which the first time point is a time point when the first client receives the live streaming pausing operation and the second time point is a time point when the first client receives the live streaming resuming operation; splicing by the live streaming server a first live streaming video segment and a second live streaming video segment of the live streaming room based on the first time point and the second time point to form a live streaming playback video or sending the first time point and the second time point to the second client to instruct the second client to obtain the live streaming playback video through splicing.

The first live streaming video segment is a live streaming video segment before the first time point, and the second live streaming video segment is a live streaming video segment after the second time point.

In detail, in a case that the live streaming is finished in the live streaming room, the live steaming server or the second client may perform the following.

If a complete historical live streaming video (a live streaming video including a paused part) has a time length greater than a preset time length, a paused live streaming segment is deleted from the complete historical live streaming video to obtain the first live streaming video segment and the second live streaming video segment. A head of the second live streaming video segment is spliced to a tail of the first live streaming video segment to form a complete live streaming playback video.

In this way, in a case that the audience would like to playback the live streaming of the live streaming room, the second client playbacks the live streaming based on the live streaming playback video. Since the live streaming playback video does not contain the paused live streaming segment, effective live streaming content is played for the audience during the playback.

Figure 4:
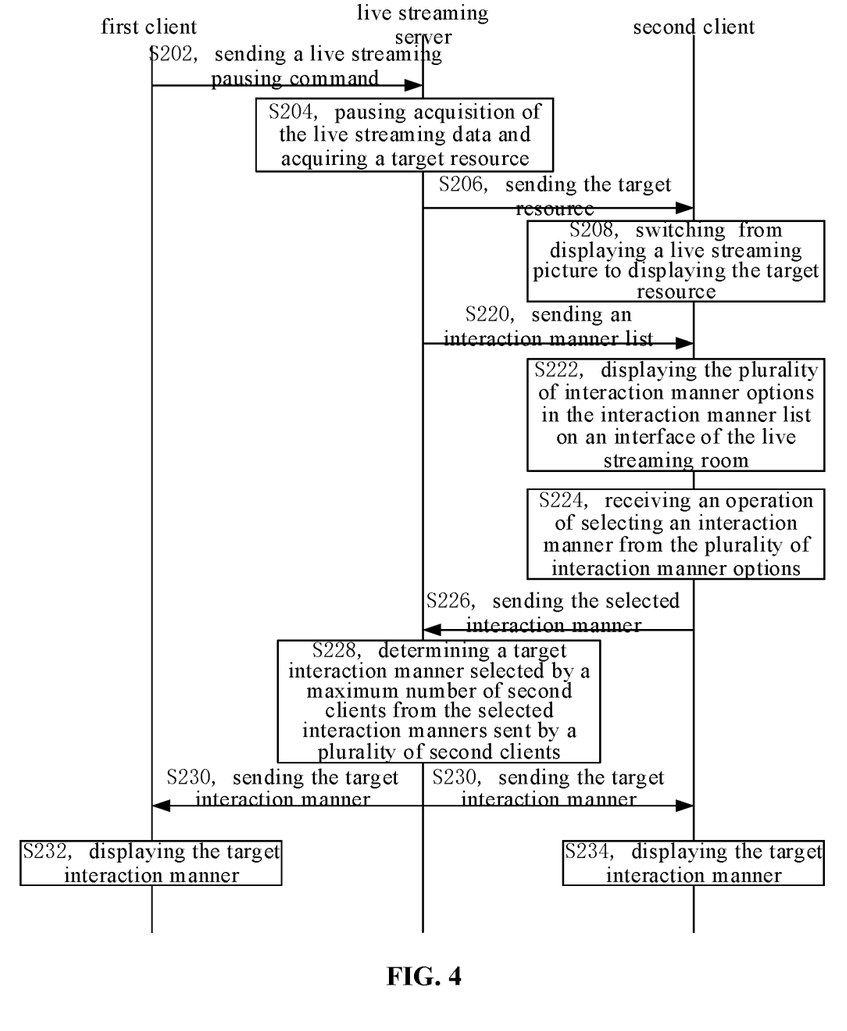
FIG. 4 is a flowchart illustrating a method for live streaming according to an embodiment of the disclosure.

In one or more embodiments of the disclosure, as illustrated in FIG. 4, after the live streaming server receives a live streaming pausing command sent by the first client, the method may further include the following.

In S220, the live streaming server sends an interaction manner list to the first client. The interaction manner list contains a plurality of interaction manner options. For example, the interaction manner list may include interaction manner options such as singing, joking, giving money in red envelopes.

In S222, the second client displays the plurality of interaction manner options in the interaction manner list on an interface of the live streaming room so that the audience may select one interaction manner from the plurality of interaction manner options.

In S224, the second client receives an operation of selecting an interaction manner from the plurality of interaction manner options.

In S226, the second client sends the interaction manner selected from the plurality of interaction manner options to the live streaming server.

In S228, the live streaming server receives the selected interaction manners sent by a plurality of second clients, and determines a target interaction manner selected by a maximum number of second clients from the selected interaction manners.

In S230, the live streaming server sends information on the target interaction manner to the first client and the second client.

In S232, the target interaction manner is displayed on the interface of the live streaming room of the first client.

In S234, the target interaction manner is displayed on the interface of the live streaming room of the second client.

In this way, within the time period during which the anchor pauses the live streaming, the audience may vote to select the target interaction manner for punishing the anchor due to the pause of the live streaming. After the anchor resumes the live streaming, the anchor may interact with the audience based on the target interaction manner. In this way, the anchor may fully interact with the audience during the live streaming. Further, atmosphere the live streaming room may not be affected by the leaving of the anchor, but be promoted since the audience may vote to determine a punishment of anchor for the leaving.

Figure 5:
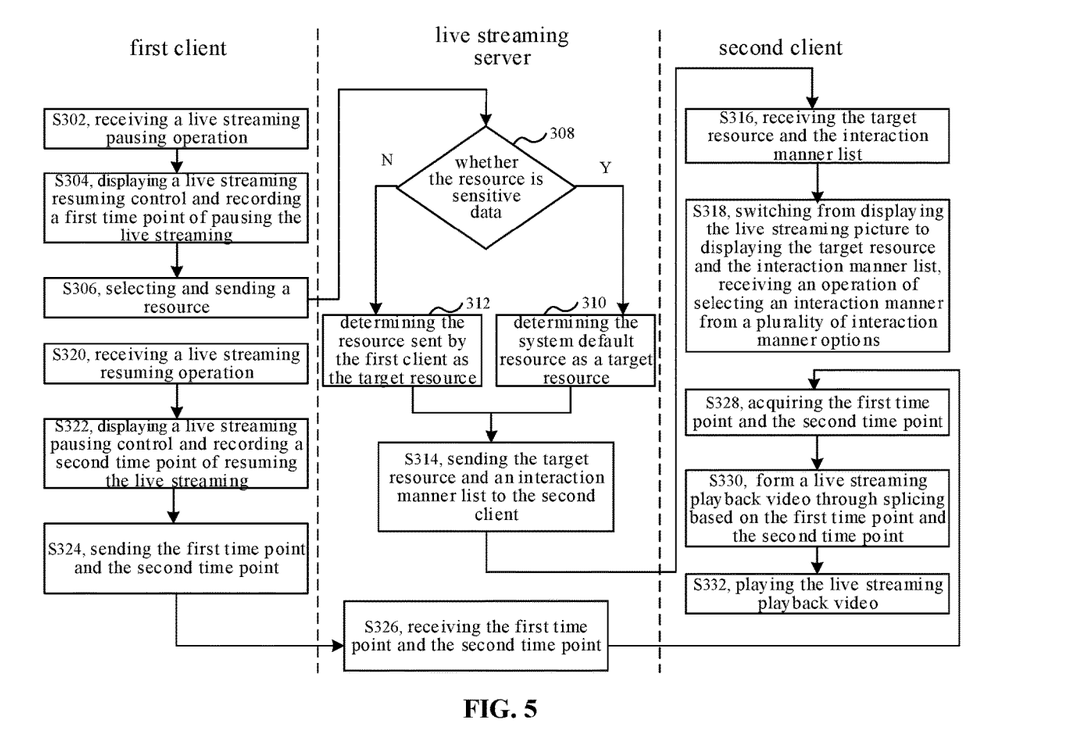
FIG. 5 is a flowchart illustrating a method for live streaming according to an embodiment of the disclosure.

The method will be further described below with reference to FIG. 5. FIG. 5 is a flowchart illustrating a method for live streaming according to an embodiment of the disclosure. As illustrated in FIG. 5, the method includes the following.

In S302, the first client receives an operation on a live streaming pausing control of a live streaming picture from the anchor.

In S304, the first client switches the displayed control from the live streaming pausing control to a live streaming resuming control, so that the anchor may perform an operation on the live streaming resuming control to resume the live streaming when the anchor wants to resume the live streaming. A first time point when the operation performed on the live streaming pausing control is received in S302 is recorded.

In S306, the first client selects a resource and sends the selected resource to the live streaming server. In a case that a preset resource set by the anchor in advance is locally stored on the first client, the preset resource is selected. In a case that no preset resource set by the anchor in advance is locally stored on the first client, a system default resource is selected.

In S308, the live streaming server recognizes whether the resource sent by the first client is sensitive data, if yes, S310 is executed, if no, S312 is executed.

In S310, the live streaming server determines the system default resource as a target resource.

In S312, the live streaming server determines the resource sent by the first client as the target resource.

In S314, the live streaming server sends the target resource and an interaction manner list to the second client.

In S316, the second client receives the target resource and the interaction manner list sent by the live streaming server.

In S318, the second client switches from displaying the live streaming picture to displaying the target resource and the interaction manner list, receives an operation of selecting an interaction manner from a plurality of interaction manner options in the interaction manner list, sends the selected interaction manner to the live streaming server, such that the live streaming server collects the selected interaction manners from a plurality of second clients, determines a target interaction manner selected by the maximum number of second clients, and sends the target interaction manner to the first client and each second client.

In S320, the first client receives an operation on the live streaming resuming control from the anchor.

In S322, the first client switches the displayed control from the live streaming resuming control to the live streaming pausing control and records a second time point when the operation performed on the live streaming resuming control is received.

In S324, the first client sends the first time point and the second time point to the live streaming server.

In S326, the live streaming server receives the first time point and the second time point sent by the first client.

In S328, the second client acquires the first time point and the second time point from the live streaming server in response to receiving a live streaming playback operation.

In S330, the second client splices a first live streaming video segment and a second live streaming video segment of the live streaming room based on the first time point and the second time point to form a live streaming playback video.

In S332, the second client plays the live streaming playback video.

Figure 6:
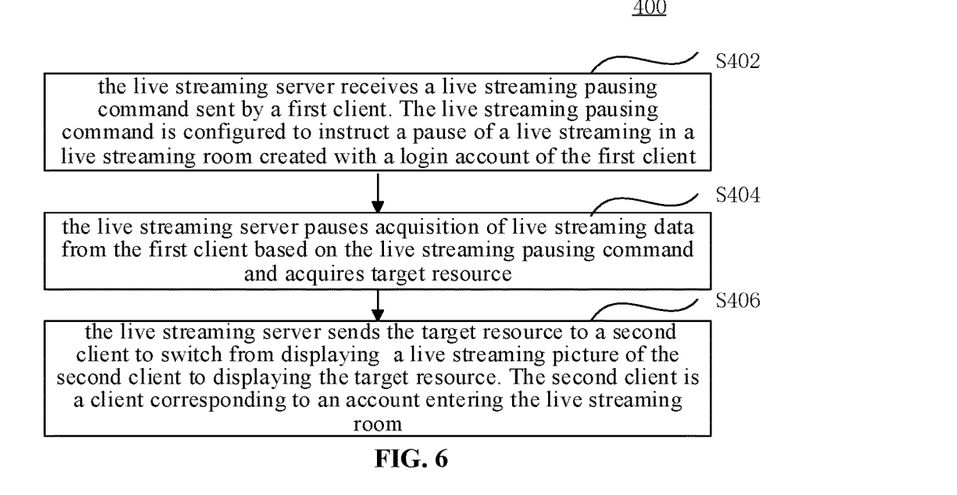
FIG. 6 is a flowchart illustrating a method for live streaming according to an embodiment of a first aspect of the disclosure.

Based on the above method, a method for live streaming provided by a first aspect of the disclosure is described below. FIG. 6 is a flowchart illustrating a method for live streaming according to an embodiment of a first aspect of the disclosure. The method is applied in a live streaming server. As illustrated in FIG. 6, the method 400 includes the following.

In S402, the live streaming server receives a live streaming pausing command sent by a first client. The live streaming pausing command is configured to instruct a pause of a live streaming in a live streaming room created with a login account of the first client.

In S404, the live streaming server pauses acquisition of live streaming data from the first client based on the live streaming pausing command and acquires target resource.

In S406, the live streaming server sends the target resource to a second client to instruct the second client to switch from displaying a live streaming picture to displaying the target resource. The second client is a client corresponding to an account entering the live streaming room.

In the embodiment, since the live streaming server replaces the data pushed to the live streaming room with the target resource, displaying of the live streaming picture of the audience of the second client is switched to displaying of the target resource. In this way, if the anchor needs to leave the live streaming room, the anchor may perform the live streaming pausing operation to pause the displaying of the live streaming picture on the second client, such that the personal privacy of the anchor is protected and leakage of the personal privacy of the anchor is avoided.

In one or more embodiments of the disclosure, acquiring by the live streaming server the target resource may include acquiring key information of live streaming content corresponding to the live streaming room; and selecting by the live streaming server the target resource matched with the key information from a plurality of preset resources.

In the embodiment, the target resource matched with the key information of the live streaming content is selected from the plurality of preset resources, such that the target resource displayed on the second client is adapted to the content of the current live streaming, thus avoiding sense of disharmony when displaying the target resource during the live streaming and improving experience of watching the live streaming.

In one or more embodiments of the disclosure, acquiring the target resource may include receiving the target resource sent by the first client, in which the target resource comprises a preset resource locally stored in the first client.

In one or more embodiments of the disclosure, pausing acquisition of live streaming data from the first client includes pausing acquisition of image data from the first client. In a case that the target resource is graphics and text information, after receiving the live streaming pausing command sent by the first client, the method 400 may further include maintaining by the live streaming server acquisition of audio data from the first client; and sending by the live streaming server the audio data to the second client to play the audio data during the displaying of the target resource on the second client.

In the embodiment, in a case that the anchor instructs a pause of the live streaming, the live streaming server pauses acquisition of the image data from the first client but maintains acquisition of the audio data from the first client and sends the audio data to the second client. In this way, the second client may play the audio data when displaying the target resource. Thus, although the second client of the audience pauses the displaying of the live streaming picture, the anchor can communicate with the audience through audio, which may not cause leakage of the personal privacy of the anchor and may not interrupt the communication between the anchor and the audience.

In one or more embodiments of the disclosure, after sending the target resource to the second client, the method 400 may further include receiving by the live streaming server a live streaming resuming command sent by the first client, in which the live streaming resuming command is configured to instruct resumption of the live streaming in the live streaming room; resuming by the live streaming server acquisition of the live streaming data from the first client based on the live streaming resuming command; and sending by the live streaming server the live streaming data to the second client to display the live streaming picture on an interface of the live streaming room of the second client.

In the embodiment, after the anchor pauses the live streaming, if the anchor would like to resume the live streaming, the anchor may perform the live streaming resuming operation on the first client, such that the first client sends the live streaming resuming command to the live streaming server. The live streaming server may resume acquisition of the live streaming data from the first client, and sends the live streaming data to the second client. The second client may resume the displaying of the live streaming picture, so as to resume the live streaming.

In one or more embodiments of the disclosure, the live streaming pausing command is sent by the first client in response to receiving a live streaming pausing operation, and the live streaming resuming command is sent by the first client in response to receiving a live streaming resuming operation. After sending the target resource to the second client, the method 400 may further include acquiring by the live streaming server a first time point and a second time point, in which the first time point is a time point when the first client receives the live streaming pausing operation and the second time point is a time point when the first client receives the live streaming resuming operation; and forming by the live streaming server a live streaming playback video by splicing a first live streaming video segment and a second live streaming video segment of the live streaming room based on the first time point and the second time point, or sending by the live streaming server the first time point and the second time point to the second client, to instruct the second client to obtain a live streaming playback video through splicing. The first live streaming video segment is a live streaming video segment before the first time point, and the second live streaming video segment is a live streaming video segment after the second time point.

In the embodiment, since the live streaming playback video does not contain the paused live streaming segment, effective live streaming content is played for the audience during the playback.

In one or more embodiments of the disclosure, after receiving the live streaming pausing command sent by the first client, the method 400 may further include sending by the live streaming server the interaction manner list to the second client to display a plurality of interaction manner options in a interaction manner list on an interface of the live streaming room of the second client and receive an operation of selecting an interaction manner from the plurality of interaction manner options; receiving by the live streaming server selected interaction manners sent by a plurality of second clients; determining by the live streaming server a target interaction manner selected by a maximum number of second clients from the selected interaction manners; and sending by the live streaming server information on the target interaction manner to the first client and each second client to display the target interaction manner on an interface of the live streaming room of the first client and an interface of the live streaming room of the second client.

In the embodiment, within the time period during which the anchor pauses the live streaming, the audience may vote to select the target interaction manner for punishing the anchor due to the pause of the live streaming. After the anchor resumes the live streaming, the anchor may interact with the audience based on the target interaction manner. In this way, the anchor may fully interact with the audience during the live streaming. Further, atmosphere the live streaming room may not be affected by the leaving of the anchor, but be promoted since the audience may vote to determine a punishment of anchor for the leaving.

Figure 7:
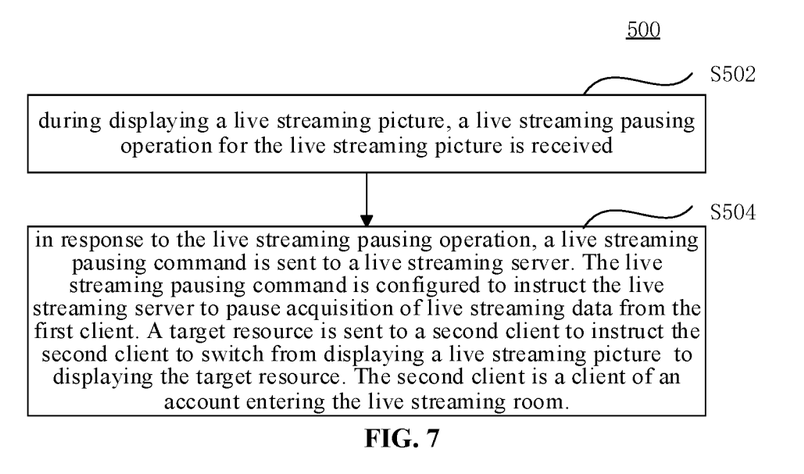
FIG. 7 is a flowchart illustrating a method for live streaming according to an embodiment of a second aspect of the disclosure.

A method for live streaming provided by a second aspect of the disclosure is described below. FIG. 7 is a flowchart illustrating a method for live streaming according to an embodiment of a second aspect of the disclosure. The method is applied in a first client. As illustrated in FIG. 7, the method 500 includes the following.

In S502, during displaying a live streaming picture, a live streaming pausing operation for the live streaming picture is received.

In S504, in response to the live streaming pausing operation, a live streaming pausing command is sent to a live streaming server. The live streaming pausing command is configured to instruct the live streaming server to pause acquisition of live streaming data from the first client. A target resource is sent to a second client to instruct the second client to switch from displaying a live streaming picture of the second client to displaying the target resource. The second client is a client of an account entering the live streaming room.

In the embodiment, the anchor may pause the live streaming according to his own requirements. In a case that the first client receives the live streaming pausing operation, the first client sends the live streaming pausing command to the live streaming server, so that the live streaming server replaces the data pushed to the live streaming room with the target resource. Thus, displaying of the live streaming picture of the second client of the audience is switched to displaying of the target resource. In this way, if the anchor needs to leave the live streaming room, the anchor may perform the live streaming pausing operation to pause the displaying of the live streaming picture on the second client, such that the personal privacy of the anchor is protected and leakage of the personal privacy of the anchor is avoided.

In one or more embodiments of the disclosure, the method 500 may further include receiving an operation of selecting the target resource from a plurality of preset resources in a case that the plurality of preset resources are displayed; and sending the target resource to the live streaming server in response to the operation.

As an example, the first client may display a plurality of preset resources after receiving the live streaming pausing operation, so that the anchor may select the target resource which is displayed on the second client of the audience during the pause of the live streaming from the plurality of preset resources.

As another example, the first client may preset the target resource. In detail, before receiving the live streaming pausing operation (for example before starting the live streaming), a plurality of preset resources are displayed, so that the anchor selects the target resource before the live streaming is paused.

In the embodiment, a plurality of reset resources may be set on the first client in advance, and the plurality of preset resources may be displayed after receiving the live streaming pausing operation for the live streaming picture, so that the anchor may select the target resource from the plurality of preset resources. In this way, the target resource displayed on the second client meets the anchor's requirements.

In one or more embodiments of the disclosure, after sending the live streaming pausing command to the live streaming server, the method 500 may further include acquiring a first time point and a second time point in response to receiving a live streaming resuming operation, in which the first time point is a time point when the live streaming pausing operation is received and the second time point is a time point when the live streaming resuming operation is received; and sending the first time point and the second time point to the live streaming server, in which a live streaming playback video is formed by splicing a live streaming video segment before the first time point and a live streaming video segment after the second time point based on the first time point and the second time point.

In the embodiment, the first time point of pausing the live streaming and the second time point of resuming the live streaming are sent to the live streaming server to form the live streaming playback video excluding the paused live streaming segment. In a case that the audience would like to playback the live streaming of the live streaming room, the second client playbacks the live streaming based on the live streaming playback video. Since the live streaming playback video does not contain the paused live streaming segment, effective live streaming content is played for the audience during the playback.

In one or more embodiments of the disclosure, after sending the live streaming pausing command to the live streaming server, the method 500 may further include receiving information on a target interaction manner sent by the live streaming server, in which the target interaction manner is determined by the live streaming server from interaction information sent by a plurality of second clients, in which the interaction information represents an interaction manner with an anchor selected by an audience; and displaying the target interaction manner.

In the embodiment, within the time period during which the anchor pauses the live streaming, the audience may vote to select the target interaction manner for punishing the anchor due to the pause of the live streaming. After the anchor resumes the live streaming, the anchor may interact with the audience based on the target interaction manner. In this way, the anchor may fully interact with the audience during the live streaming. Further, atmosphere the live streaming room may not be affected by the leaving of the anchor, but be promoted since the audience may vote to determine a punishment of anchor for the leaving.

Figure 8:
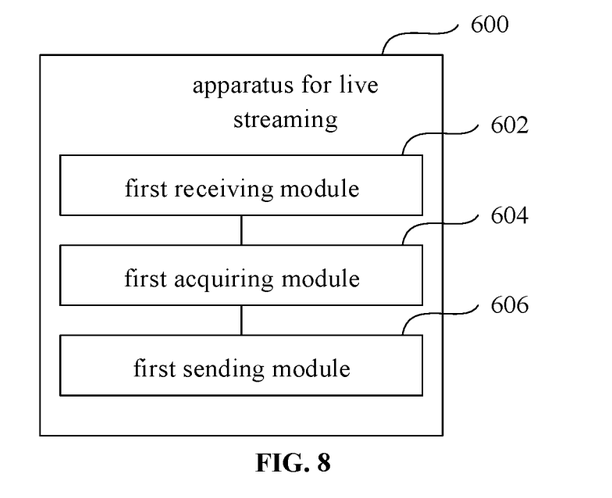
FIG. 8 is a block diagram illustrating an apparatus for live streaming according to an embodiment of a third aspect of the disclosure.

Corresponding to the method for live streaming provided by the first aspect of the disclosure, a third aspect of the disclosure provides an apparatus for live streaming. FIG. 8 is a block diagram illustrating an apparatus for live streaming according to an embodiment of a third aspect of the disclosure. As illustrated in FIG. 8, the apparatus 600 includes a first receiving module 602, a first acquiring module 604 and a first sending module 606.

The first receiving module 602 is configured to receive a live streaming pausing command sent by a first client, in which the live streaming pausing command is configured to instruct a pause of a live streaming in a live streaming room created with a login account of the first client.

The first acquiring module 604 is configured to pause acquisition of live streaming data from the first client and acquire a target resource based on the live streaming pausing command.

The first sending module 606 is configured to send the target resource to the second client to instruct a second client to switch from displaying a live streaming picture to displaying the target resource, in which the second client comprises a client of an account entering the live streaming room.

In the embodiment, since the live streaming server replaces the data pushed to the live streaming room with the target resource, displaying of the live streaming picture of the audience of the second client is switched to displaying of the target resource. In this way, if the anchor needs to leave the live streaming room, the anchor may perform the live streaming pausing operation to pause the displaying of the live streaming picture on the second client, such that the personal privacy of the anchor is protected and leakage of the personal privacy of the anchor is avoided.

In one or more embodiments of the disclosure, the first acquiring module 602 may include an acquiring unit, configured to acquire key information of live streaming content corresponding to the live streaming room; and a selecting unit, configured to select the target resource matched with the key information from a plurality of preset resources.

In the embodiment, the target resource matched with the key information of the live streaming content is selected from the plurality of preset resources, such that the target resource displayed on the second client is adapted to the content of the current live streaming, thus avoiding sense of disharmony when displaying the target resource during the live streaming and improving experience of watching the live streaming.

In one or more embodiments of the disclosure, the first acquiring module 602 is configured to receive the target resource sent by the first client, in which the target resource comprises a preset resource locally stored in the first client.

In one or more embodiments of the disclosure, pausing acquisition of live streaming data from the first client includes pausing acquisition of image data from the first client.

The apparatus 600 may further include a second acquiring module and a second sending module. The second acquiring module is configured to maintain acquisition of audio data from the first client. The second sending module is configured to send the audio data to the second client to play the audio data during the displaying of the target resource on the second client.

In the embodiment, in a case that the anchor instructs a pause of the live streaming, the live streaming server pauses acquisition of the image data from the first client but maintains acquisition of the audio data from the first client and sends the audio data to the second client. In this way, the second client may play the audio data when displaying the target resource. Thus, although the second client of the audience pauses the displaying of the live streaming picture, the anchor can communicate with the audience through audio, which may not cause leakage of the personal privacy of the anchor and may not interrupt the communication between the anchor and the audience.

In one or more embodiments of the disclosure, the apparatus further includes a second receiving module, a resuming module and a third sending module. The second receiving module is configured to receive a live streaming resuming command sent by the first client, in which the live streaming resuming command is configured to instruct resumption of the live streaming in the live streaming room. The resuming module is configured to resume acquisition of the live streaming data from the first client based on the live streaming resuming command. The third sending module is configured to send the live streaming data to the second client to instruct the second client to display the live streaming picture on an interface of the live streaming room of the second client.

In the embodiment, after the anchor pauses the live streaming, if the anchor would like to resume the live streaming, the anchor may perform the live streaming resuming operation on the first client, such that the first client sends the live streaming resuming command to the live streaming server. The live streaming server may resume acquisition of the live streaming data from the first client, and sends the live streaming data to the second client. The second client may resume the displaying of the live streaming picture, so as to resume the live streaming.

In one or more embodiments of the disclosure, the live streaming pausing command is sent by the first client in response to receiving a live streaming pausing operation, and the live streaming resuming command is sent by the first client in response to receiving a live streaming resuming operation.

The apparatus 600 may further include a third acquiring module, configured to acquire a first time point and a second time point, in which the first time point is a time point when the first client receives the live streaming pausing operation and the second time point is a time point when the first client receives the live streaming resuming operation.

The apparatus 600 may further include a splicing module or a fourth sending module. The splicing module is configured to form a live streaming playback video by splicing a first live streaming video segment and a second live streaming video segment of the live streaming room based on the first time point and the second time point. The fourth sending module is configured to send the first time point and the second time point to the second client, to instruct the second client to obtain a live streaming playback video through splicing. The first live streaming video segment is a live streaming video segment before the first time point, and the second live streaming video segment is a live streaming video segment after the second time point.

In the embodiment, since the live streaming playback video does not contain the paused live streaming segment, effective live streaming content is played for the audience during the playback.

In one or more embodiments of the disclosure, the apparatus 600 may further include a fifth sending module, a third receiving module, a counting module and a sixth sending module. The fifth sending module is configured to send the interaction manner list to the second client to instruct the second client to display a plurality of interaction manner options in the interaction manner list on an interface of the live streaming room of the second client, and to receive an operation of selecting an interaction manner from the plurality of interaction manner options. The third receiving module is configured to receive selected interaction manners sent by a plurality of second clients. The counting module is configured to determine a target interaction manner selected by a maximum number of second clients from the selected interaction manners. The sixth sending module is configured to send information on the target interaction manner to the first client and each second client to display the target interaction manner on an interface of the live streaming room of the first client and an interface of the live streaming room of the second client.

In the embodiment, within the time period during which the anchor pauses the live streaming, the audience may vote to select the target interaction manner for punishing the anchor due to the pause of the live streaming. After the anchor resumes the live streaming, the anchor may interact with the audience based on the target interaction manner. In this way, the anchor may fully interact with the audience during the live streaming. Further, atmosphere the live streaming room may not be affected by the leaving of the anchor, but be promoted since the audience may vote to determine a punishment of anchor for the leaving.

With respect to the apparatus according to the embodiment described above, the ways to perform operations by respective modules have been described in the associated method embodiments, which are not described here.

The disclosure further provides a server. The server includes a processor and a memory configured to store instructions executable by the processor. The processor is configured to execute the instructions to perform the method according to any of embodiments of the first aspect.

Figure 9:
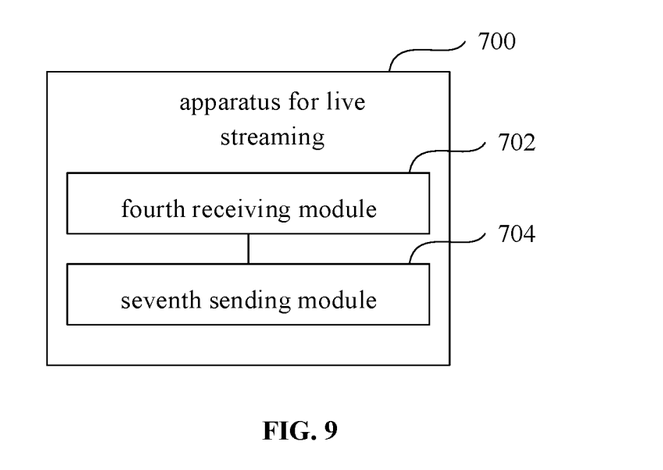
FIG. 9 is a block diagram illustrating an apparatus for live streaming according to an embodiment of a fourth aspect of the disclosure.

Corresponding to the method for live streaming provided by the second aspect of the disclosure, a fourth aspect of the disclosure provides an apparatus for live streaming. FIG. 9 is a block diagram illustrating an apparatus for live streaming according to an embodiment of a fourth aspect of the disclosure. As illustrated in FIG. 9, the apparatus 700 includes a fourth receiving module 702 and a seventh sending module 704.

The fourth receiving module 702 is configured to receive a live streaming pausing operation for a live streaming picture during displaying of the live streaming picture.

The seventh sending module 704 is configured to send a live streaming pausing command to a live streaming server in response to the live streaming pausing operation, in which the live streaming pausing command is configured to instruct the live streaming server to pause acquisition of live streaming data from the first client; and send the target resource to the second client to instruct the second client to switch from displaying a live streaming picture to displaying target resource, in which the second client comprises a client of an account entering the live streaming room.

In the embodiment, the anchor may pause the live streaming according to his own requirements. In a case that the first client receives the live streaming pausing operation, the first client sends the live streaming pausing command to the live streaming server, so that the live streaming server replaces the data pushed to the live streaming room with the target resource. Thus, displaying of the live streaming picture of the second client of the audience is switched to displaying of the target resource. In this way, if the anchor needs to leave the live streaming room, the anchor may perform the live streaming pausing operation to pause the displaying of the live streaming picture on the second client, such that the personal privacy of the anchor is protected and leakage of the personal privacy of the anchor is avoided.

In one or more embodiments of the disclosure, the apparatus 700 may further include a fifth receiving module and an eighth sending module.

The fifth receiving module is configured to receive an operation of selecting the target resource from a plurality of preset resources in a case that the plurality of preset resources are displayed.

The eighth sending module is configured to send the target resource to the live streaming server in response to the operation.

In the embodiment, a plurality of reset resources may be set on the first client in advance, and the plurality of preset resources may be displayed after receiving the live streaming pausing operation for the live streaming picture, so that the anchor may select the target resource from the plurality of preset resources. In this way, the target resource displayed on the second client meets the anchor's requirements.

In one or more embodiments of the disclosure, the apparatus 700 may further include a fourth acquiring module and a ninth sending module.

The fourth acquiring module is configured to acquire a first time point and a second time point in response to receiving a live streaming resuming operation, in which the first time point is a time point when the live streaming pausing operation is received and the second time point is a time point when the live streaming resuming operation is received.

The ninth sending module is configured to send the first time point and the second time point to the live streaming server, in which a live streaming playback video is formed by splicing a live streaming video segment before the first time point and a live streaming video segment after the second time point based on the first time point and the second time point.

In the embodiment, the first time point of pausing the live streaming and the second time point of resuming the live streaming are sent to the live streaming server to form the live streaming playback video excluding the paused live streaming segment. In a case that the audience would like to playback the live streaming of the live streaming room, the second client playbacks the live streaming based on the live streaming playback video. Since the live streaming playback video does not contain the paused live streaming segment, effective live streaming content is played for the audience during the playback.

In one or more embodiments of the disclosure, the apparatus 700 may further include a sixth receiving module and a displaying module.

The sixth receiving module is configured to receive information on a target interaction manner sent by the live streaming server, in which the target interaction manner is determined by the live streaming server from interaction information sent by a plurality of second clients, in which the interaction information represents an interaction manner with an anchor selected by an audience.

The displaying module is configured to display the target interaction manner.

In the embodiment, within the time period during which the anchor pauses the live streaming, the audience may vote to select the target interaction manner for punishing the anchor due to the pause of the live streaming. After the anchor resumes the live streaming, the anchor may interact with the audience based on the target interaction manner. In this way, the anchor may fully interact with the audience during the live streaming. Further, atmosphere the live streaming room may not be affected by the leaving of the anchor, but be promoted since the audience may vote to determine a punishment of anchor for the leaving.

A fifth aspect of the disclosure further provides a server. The server includes a processor and a memory configured to store instructions executable by the processor. The processor is configured to execute the instructions to perform the method according to any of embodiments of the first aspect.

Figure 10:
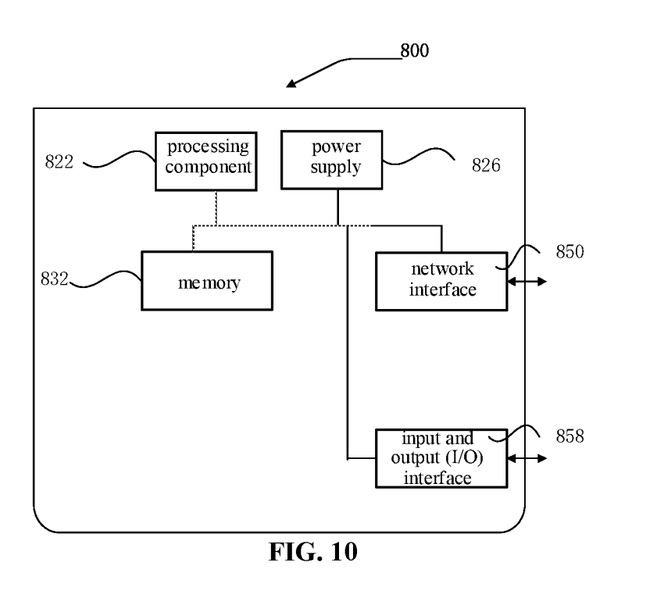
FIG. 10 is a block diagram illustrating a server according to an embodiment of the disclosure.

FIG. 10 is a block diagram of a server according to an embodiment of the disclosure. Referring to FIG. 10, the server 800 may include a processing component 822 including one or more processors, and a memory resource represented by a memory 832 for storing instructions (such as application programs) executable by the processing component 822. The application programs stored in the memory 832 may include one or more modules, and each module may correspond to a series of instructions. Furthermore, the processing component 822 may be configured to execute the instructions so as to perform the above-mentioned method for live streaming according to any of embodiments of the first aspect.

The server 800 may further include a power supply 826 configured to perform a power management of the server 800, a wired or wireless network interface 850 configured to connect the server 800 to the internet, and an input and output (I/O) interface 858. The server 800 may operate an operating system stored in the memory 832, such as Windows Server™, Mac OS X™, Unix™, Linux™, FreeBSD™ and so on.

The disclosure further provides an electronic device. The electronic device includes a processor and a memory configured to store instructions executable by the processor. The processor is configured to execute the instructions to perform the method according to any of embodiments of the second aspect.

The disclosure further provides a live streaming system. The system includes a first client, a server according to the third aspect and a second client. The first client is configured to send a live streaming pausing command to the server, in which the live streaming pausing command is configured to instruct a pause of a live streaming in a live streaming room created with a login account of the first client. The server is configured to perform the method according to the first aspect. The second client is configured to receive target resource sent by the server, and switch from displaying a live streaming picture to displaying the target resource, in which the second client comprises a client of an account entering the live streaming room.

The disclosure further provides a computer readable storage medium. When instructions in the computer readable storage medium are executed by a processor of a server, the server is caused to perform the method according to any of embodiments of the first aspect or the second aspect.

In an embodiment, the present disclosure provides a non-transitory computer-readable storage medium, such as memory including instructions, which can be executed by the processor of the electronic device to complete the foregoing method. For example, the non-transitory computer-readable storage medium may be ROM, random access memory (RAM), CD-ROM, magnetic tape, floppy disk, optical data storage device, etc.

The present disclosure further provides a computer program product including computer programs/instructions, which can be executed by a processor to perform the method according to any of embodiments of the first aspect or the second aspect.

Those skilled in the art may easily conceive of other embodiments of the disclosure by considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the disclosure is not limited to the precise structure that has been described above and shown in the drawings, and various modifications and changes can be made without departing from the scope thereof. The scope of the disclosure is limited only by the appended claims.

What is claimed is:

1. A method for live streaming, the method comprising:
 receiving, by a server, a live streaming pausing command from a first client, wherein the live streaming pausing command is configured to instruct a pause of a live streaming in a live streaming room created with a login account of the first client;
 pausing, by the server, acquisition of live streaming data from the first client based on the live streaming pausing command;
 acquiring, by the server, a target resource based on the live streaming pausing command;
 sending, by the server, the target resource to a second client to instruct the second client to switch from displaying a live streaming picture to displaying the target resource, wherein the second client comprises a client of an account entered in the live streaming room;
 receiving a live streaming resuming command from the first client, wherein the live streaming resuming command is configured to instruct resumption of the live streaming in the live streaming room;
 resuming acquisition of the live streaming data from the first client based on the live streaming resuming command; and
 sending the live streaming data to the second client to instruct the second client to display the live streaming picture on an interface of the live streaming room of the second client;
 wherein the live streaming pausing command is received from the first client in response to receiving a live streaming pausing operation, and the live streaming resuming command is received from the first client in response to receiving a live streaming resuming operation;

wherein the method further comprises:
acquiring a first time point and a second time point, wherein the first time point is a time point when the first client receives the live streaming pausing operation and the second time point is a time point when the first client receives the live streaming resuming operation; and
forming a live streaming playback video by splicing a first live streaming video segment and a second live streaming video segment of the live streaming room based on the first time point and the second time point;
wherein the first live streaming video segment is a live streaming video segment before the first time point, and the second live streaming video segment is a live streaming video segment after the second time point.

2. The method of claim 1, wherein the acquiring the target resource comprises:
acquiring key information of live streaming content of the live streaming room; and
selecting the target resource matched with the key information from a plurality of preset resources.

3. The method of claim 2, wherein the selecting the target resource matched with the key information of the live streaming content from the plurality of preset resources comprises:
extracting key information from each preset resource of the plurality of preset resources;
determining a similarity between the key information of the live streaming content and the key information from each preset resource of the plurality of preset resources; and
selecting the target resource having a similarity greater than a preset similarity threshold or with a maximum similarity among the plurality of preset resources.

4. The method of claim 1, wherein the acquiring the target resource comprising:
receiving the target resource from the first client, wherein the target resource comprises a preset resource locally stored in the first client.

5. The method of claim 1, wherein the pausing acquisition of live streaming data from the first client comprises:
pausing acquisition of image data from the first client;
wherein the target resource is graphics and text information, and the method further comprises:
maintaining acquisition of audio data from the first client; and
sending the audio data to the second client to instruct the second client to play the audio data during the displaying of the target resource on the second client.

6. The method of claim 1,
wherein the method further comprises:
sending the first time point and the second time point to the second client, to instruct the second client to obtain a live streaming playback video through splicing of a first live streaming video segment and a second live streaming video segment of the live streaming room.

7. The method of claim 1, further comprising:
sending an interaction manner list to the second client to instruct the second client to display a plurality of interaction manner options in the interaction manner list on an interface of the live streaming room of the second client;
receiving selected interaction manners from a plurality of second clients;
determining a target interaction manner from a maximum number of second clients from the interaction manners; and
sending information on the target interaction manner to the first client and each second client of the plurality of second clients to display the target interaction manner on an interface of the live streaming room of the first client and an interface of the live streaming room of each second client of the plurality of second clients.

8. The method of claim 1, further comprising:
determining whether the target resource is sensitive data;
wherein the sending the target resource to the second client comprises:
sending the target resource to the second client in response to determining that the target resource is sensitive data.

9. The method of claim 8, wherein the determining whether the target resource is sensitive data comprises:
determining a keyword in speech corresponding to audio data in response to determining that the target resource comprises the audio data; and
determining whether the target resource is sensitive data based on the keyword.

10. The method of claim 8, wherein the determining whether the target resource is sensitive data comprises:
determining character feature information in character image data in response to determining that the target resource comprises the character image data, wherein the character feature information comprises at least one of: age, gender, gestures, or a degree of exposure of body parts; and
determining whether the target resource is sensitive data based on the character feature information.

11. A method for live streaming, the method comprising:
receiving, by a first client, a live streaming pausing operation for a live streaming picture during displaying of the live streaming picture in a live streaming room;
sending, by the first client, a live streaming pausing command to a live streaming server in response to the live streaming pausing operation, wherein the live streaming pausing command is configured to instruct the live streaming server to pause acquisition of live streaming data from the first client and to send a target resource to a second client in order to switch the second client from displaying a live streaming picture to displaying the target resource, wherein the second client comprises a client of an account entered in the live streaming room;
acquiring a first time point and a second time point in response to receiving a live streaming resuming operation, wherein the first time point is a time point when the live streaming pausing operation is received and the second time point is a time point when the live streaming resuming operation is received; and
sending the first time point and the second time point to the live streaming server, wherein a live streaming playback video is formed by splicing a first live streaming video segment before the first time point and a second live streaming video segment after the second time point based on the first time point and the second time point.

12. The method of claim 11, further comprising:
receiving an operation of selecting the target resource from a plurality of preset resources displayed on the first client; and sending the target resource to the live streaming server in response to the operation of selecting the target resource.

13. The method of claim 11, further comprising:
receiving a target interaction manner from the live streaming server, wherein the target interaction manner is determined by the live streaming server from interaction information from a plurality of second clients, wherein the interaction information represents an interaction manner with an anchor selected by an audience; and
displaying the target interaction manner.

14. A server, comprising:
a memory configured to store instructions; and
a processor configured to execute the instructions to perform a method for live streaming comprising steps of:
receiving a live streaming pausing command from a first client, wherein the live streaming pausing command is configured to instruct a pause of a live streaming in a live streaming room created with a login account of the first client;
pausing acquisition of live streaming data from the first client based on the live streaming pausing command;
acquiring a target resource based on the live streaming pausing command; and
sending the target resource to a second client to instruct the second client to switch from displaying a live streaming picture to displaying the target resource, wherein the second client comprises a client of an account entered in the live streaming room;
receiving a live streaming resuming command from the first client, wherein the live streaming resuming command is configured to instruct resumption of the live streaming in the live streaming room;
resuming acquisition of the live streaming data from the first client based on the live streaming resuming command; and
sending the live streaming data to the second client to instruct the second client to display the live streaming picture on an interface of the live streaming room of the second client;
wherein the live streaming pausing command is received from the first client in response to receiving a live streaming pausing operation, and the live streaming resuming command is received from the first client in response to receiving a live streaming resuming operation;
wherein the method further comprises:
acquiring a first time point and a second time point, wherein the first time point is a time point when the first client receives the live streaming pausing operation and the second time point is a time point when the first client receives the live streaming resuming operation; and
forming a live streaming playback video by splicing a first live streaming video segment and a second live streaming video segment of the live streaming room based on the first time point and the second time point;
wherein the first live streaming video segment is a live streaming video segment before the first time point, and the second live streaming video segment is a live streaming video segment after the second time point.

15. The server of claim 14, wherein the acquiring the target resource comprises:
acquiring key information of live streaming content of the live streaming room; and
selecting the target resource matched with the key information from a plurality of preset resources.

16. The server of claim 14, wherein the acquiring the target resource comprises:
receiving the target resource from the first client, wherein the target resource comprises a preset resource locally stored in the first client.

17. The server of claim 14, wherein the pausing acquisition of live streaming data from the first client comprises:
pausing acquisition of image data from the first client;
wherein the target resource is graphics and text information, and the method further comprises:
maintaining acquisition of audio data from the first client; and
sending the audio data to the second client to instruct the second client to play the audio data during the displaying of the target resource on the second client.

* * * * *